(12) United States Patent
Urmenyi et al.

(10) Patent No.: US 9,409,110 B2
(45) Date of Patent: Aug. 9, 2016

(54) METHOD OF MAINTAINING WATER QUALITY IN A PROCESS STREAM

(75) Inventors: Ana-Mariana Urmenyi, Utrecht (NL); Amit Gupta, Aurora, IL (US); Chris D. Davies, Frodsham (GB); Bert Simons, Amstelveen (NL)

(73) Assignee: NALCO COMPANY, Naperville, IL (US)

( * ) Notice: Subject to any disclaimer, the term of this patent is extended or adjusted under 35 U.S.C. 154(b) by 879 days.

(21) Appl. No.: 13/183,069

(22) Filed: Jul. 14, 2011

(65) Prior Publication Data

US 2013/0015137 A1 Jan. 17, 2013

(51) Int. Cl.
*B01D 37/04* (2006.01)
*C02F 1/00* (2006.01)
(Continued)

(52) U.S. Cl.
CPC .............. *B01D 37/04* (2013.01); *B01D 37/041* (2013.01); *B01D 37/043* (2013.01); *B01D 37/045* (2013.01); *B01D 37/046* (2013.01); *B01D 37/048* (2013.01); *C02F 1/001* (2013.01); *C02F 1/008* (2013.01); *C02F 1/32* (2013.01); *C02F 1/38* (2013.01); *C02F 1/441* (2013.01); *C02F 1/444* (2013.01); *C02F 2103/023* (2013.01); *C02F 2209/001* (2013.01); *C02F 2209/005* (2013.01); *C02F 2209/006* (2013.01); *C02F 2209/008* (2013.01); *C02F 2209/02* (2013.01);
(Continued)

(58) Field of Classification Search
CPC .......... C02F 1/001; C02F 1/008; C02F 1/444; C02F 2103/23; C02F 2209/001; C02F 2209/005; C02F 1/32; C02F 1/38; C02F 1/441; C02F 2209/06; C02F 2209/105; C02F 2209/20; C02F 2209/445; C02F 2209/048; C02F 2209/008; C02F 2209/02; C02F 2209/03; C02F 2209/04; C02F 2209/05; C02F 2209/10; C02F 2209/11; C02F 2209/36; C02F 2209/40; C02F 2301/046; C02F 2301/043; B01D 61/12; B01D 37/00–37/048
See application file for complete search history.

(56) References Cited

U.S. PATENT DOCUMENTS 4,793,932 A 12/1988 Ford et al.
4,931,187 A 6/1990 Derham et al.
(Continued)

FOREIGN PATENT DOCUMENTS

CN 2910899 Y 6/2007
DE 20 2010 012271 11/2010
(Continued)

OTHER PUBLICATIONS

Hydranautics Membrane element CPA2 specification p. Jul. 2009.*
(Continued)

*Primary Examiner* — Lucas Stelling
(74) *Attorney, Agent, or Firm* — Eric D. Babych; Brinks Gilson & Lione (57) ABSTRACT

Disclosed and claimed is a method of removing contaminants from a process stream or stabilizing a system parameter in the process stream. The method includes providing a filtration system in communication with a controller, wherein the controller is operable to automatically initiate a flow from the process stream into the filtration system when the system parameter of the process stream is within above an upper threshold value and/or below a lower threshold value; and activating the filtration system, wherein the flow comprises a flow rate through the filtration system and the controller is operable to adjust the flow rate.

2 Claims, 2 Drawing Sheets

(51) Int. Cl.
      *C02F 1/44*     (2006.01)
      *C02F 103/02*   (2006.01)
      *C02F 1/32*     (2006.01)
      *C02F 1/38*     (2006.01)

(52) U.S. Cl.
      CPC ......... *C02F 2209/03* (2013.01); *C02F 2209/04* (2013.01); *C02F 2209/06* (2013.01); *C02F 2209/10* (2013.01); *C02F 2209/105* (2013.01); *C02F 2209/11* (2013.01); *C02F 2209/20* (2013.01); *C02F 2209/36* (2013.01); *C02F 2209/40* (2013.01); *C02F 2209/445* (2013.01); *C02F 2301/043* (2013.01); *C02F 2301/046* (2013.01)

(56) References Cited

U.S. PATENT DOCUMENTS

| | | | |
|---|---|---|---|
| 5,076,931 | A   | 12/1991 | Mullee |
| 5,330,636 | A * | 7/1994  | Reichert ................ 210/96.1 |
| 5,492,632 | A   | 2/1996  | Reber |
| 5,547,584 | A * | 8/1996  | Capehart ................ 210/669 |
| 6,045,331 | A   | 4/2000  | Gehm et al. |
| 6,077,435 | A   | 6/2000  | Beck et al. |
| 6,645,383 | B1* | 11/2003 | Lee et al. ............... 210/652 |
| 6,755,970 | B1* | 6/2004  | Knappe .............. B01D 61/18 210/321.69 |
| 2001/0010296 | A1* | 8/2001 | Hirota ............... C02F 1/46104 210/175 |
| 2004/0040789 | A1  | 3/2004 | Rake et al. |
| 2005/0109703 | A1* | 5/2005 | Newenhizen .............. 210/739 |
| 2006/0091046 | A1* | 5/2006 | Rosen et al. .............. 210/85 |
| 2007/0144966 | A1  | 6/2007 | Janssen et al. |
| 2007/0181498 | A1* | 8/2007 | Kaas ................. B01D 61/022 210/641 |
| 2008/0245738 | A1* | 10/2008 | Coulter ................. 210/650 |
| 2010/0038317 | A1  | 2/2010 | Bissler et al. |
| 2010/0292844 | A1  | 11/2010 | Wolf |
| 2011/0000849 | A1  | 1/2011 | Lee et al. |

FOREIGN PATENT DOCUMENTS

| | | |
|---|---|---|
| EP | 1108684 | 6/2001 |
| EP | 1 468 964 | 10/2004 |
| JP | 2001-170639 | 6/2001 |
| JP | 2001-252662 | 9/2001 |
| JP | 2005-510338 | 4/2005 |
| JP | 2010155182 A | 7/2010 |
| WO | WO 02/098527 | 12/2002 |
| WO | WO 2004/054691 | 7/2004 |
| WO | WO 2008/105857 A1 | 9/2008 |
| WO | WO 2009/109956 A2 | 9/2009 |
| WO | WO 2011/075666 | 6/2011 |

OTHER PUBLICATIONS

International Search Report for PCT/US2012045918, dated Mar. 10, 2015 (13 pgs).

Zhang, Youheng; "Determination of Filtration Capacity of Bypass Flow in Circulating Cooling Water", Journal of Nanjing University of Technology (Natural Science Edition); First Issue, 1979, pp. 71-76.

\* cited by examiner

FIG. 1

FIG. 2

METHOD OF MAINTAINING WATER QUALITY IN A PROCESS STREAM

FIELD OF THE INVENTION

This invention relates generally to automated or semi-automated methods of removing contaminants or stabilizing process parameters in a process stream. More specifically, the invention relates to an automated or semi-automated filtration system operable to be activated and deactivated to divert a process stream through the filtration system.

BACKGROUND OF THE INVENTION

Contamination in industrial water systems is a well known and major problem in a myriad of processes. Boilers, hot water heaters, heat exchangers, steam generators, nuclear power electric systems, combustion engine and diesel coolant systems, evaporator systems, thermal desalination systems, papermaking operations, fermentation processes, ballast water, cruise ship gray water, and the like are a sampling of the types of water systems that are affected by many varieties of contamination. Being a de facto air scrubber, evaporative cooling towers are particularly prone to contamination.

As a consequence of the cooling process, cooling towers flush airborne contaminants into the water phase. These contaminants, for example, can ultimately deposit on the heat exchanger surfaces thus reducing heat transfer. Examples of such contaminants can be particulate matter, organic and inorganic contaminants, oils, process contaminants, and the like. In addition to such contaminants, microorganisms also find their way into the water system. Suspended matter in the cooling water provides the microorganisms with a readily available food source for sustaining life and reproduction. It is well established that the presence of inorganic, organic, and microbiological deposits have a detrimental impact on the operational parameters of industrial or non-industrial water systems in general, resulting in reduced efficiency and increased cost of operation.

Filtration systems are often used to partially remove these particulate contaminants and prevent them from reaching levels that can adversely impact efficient system operation. A majority of the filtration systems currently used for removing suspended solids from industrial water systems are side-stream devices of varying capital cost depending on the complexity of the device. One commonly used method involves drawing an amount of the water in the system (usually a pre-determined % of the recirculation rate in cooling towers, for example) downstream of the recirculation pumps, and then returning the filtered water into the system with the aid of a booster pump. An alternative is to return the filtered water directly to the tower basin, makeup water reservoir, etc. and requires no additional pumping. Generally, only a very small (2-4%) percentage of the recirculation water is pulled into the side stream since a larger volume could result in a significant pressure drop or lowered flow rate that could impact the efficiency of the heat exchanger.

Commonly used sand based or membrane based filtration devices are designed to work at constant filtrate flow. In general, the filtrate flow is maintained constant independent of any fouling that may occur, by increasing the applied pressure. Often, the difference in applied pressure or the difference between the incoming and outgoing pressures can be a trigger for back flushing of the filtration device. The size of the side-stream filtration unit required is calculated using the recirculation rate of the cooling system. Generally, cooling systems are large volume processes and taking the entire volume through a side-stream filter device would require a very large filtration unit which would be impractical and expensive. However, certain small volume systems and once through systems such as irrigation systems can process the total volume through the side-stream filtration device. In an automated filtration system, for example, removal of particulate debris typically results in reduced flow through the unit and the system undergoes a "backwash" flush to remove the collected debris and send it into the waste stream. Peaks of system contamination will increase fouling of the filtration device, and will lead directly to an increase in backwash frequency. Systems with a high level of contamination may require a larger filtration unit or a larger filtration media or a series of filtration devices in order to keep the system clean.

There thus exists an industrial need for improved and more efficient methods of reducing contamination and controlling system parameters in process streams. In addition to keeping the water system cleaner and maintaining the operational efficiency of the process equipment, there are several regulatory and sustainability drivers that create a need for reduction in contaminants within process streams. For example, there is increasing regulatory pressure to reduce water and chemical use, and discharge regulations are becoming more stringent. Side-stream filtration devices have been implicated in reducing the use of certain chemicals, for example oxidizing biocides, which in turn have an impact on the environmental footprint and discharge from the facility.

SUMMARY OF THE INVENTION

This invention accordingly provides a novel method of removing contaminants from a process stream or stabilizing a system parameter in the process stream. In an aspect, the method includes providing a filtration system in communication with a controller, wherein the controller is operable to automatically initiate a flow from the process stream into the filtration system when the system parameter of the process stream is above an upper threshold value and/or below a lower threshold value (e.g., outside of a range or a predetermined range); and activating the filtration system, wherein the flow comprises a flow rate through the filtration system and the controller is operable to adjust the flow rate.

It is an advantage of the invention to provide a method of reducing contamination in process streams that also reduces the demand for chemicals applied to the process streams.

It is another advantage of the invention to provide a method for controlling the inlet water flow rate of any filtration system as a function of the inlet water quality.

It is a further advantage of the invention to provide a method of removing contaminants from process streams to combat variation in quality of liquids due to contamination challenges and improve the efficiency and safety of aqueous or non-aqueous fluids systems.

It is an advantage of this invention to provide a method of using an on-demand filtration device when inlet water quality parameters are outside the set limits.

It is yet another advantage of this invention to provide a method that lowers the overall energy consumption of a filtration system by adjusting the required inlet water flow rate as a function of inlet water quality.

An added advantage of this invention is to provide a method that monitors, predicts, and demonstrates variability in the process liquid and the operational performance of the side-stream device.

Another advantage of this invention is to provide a method that can trigger an alarm due to variability in the process liquid if any of the parameters exceed set values.

It is also an advantage of this invention to provide a method that is not device specific but is applicable with any type of side-stream filtration device.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

DETAILED DESCRIPTION OF THE INVENTION

In various embodiments, a controller is used to implement the method of the invention. The controller is preferably in communication with the filtration system of the invention and is operable to receive and process information received from the various components (e.g., process parameter sensors, filtration rate sensors, etc.) herein described. The controller is further operable to partially or fully execute any or all of the steps of the method of the invention herein described. "Controller" refers to an electronic device having components such as a processor, memory device, digital storage medium, cathode ray tube, liquid crystal display, plasma display, touch screen, or other monitor, and/or other components. In an embodiment, the controller includes an interactive interface that guides a user, provides prompts to the user, or provides information to the user regarding any portion of the method of the invention. Such information may include, for example, building of calibration models, data collection, data trending, management of resulting data sets, etc. In an embodiment, the controller includes the capability to transmit received and/or processed data wirelessly or through hardwire connection to another external device such as a computer or data storage system.

The controller is preferably operable for integration and/or communication with one or more application-specific integrated circuits, programs, computer-executable instructions or algorithms, one or more hard-wired devices, wireless devices, and/or one or more mechanical devices. Moreover, the controller is operable to integrate feedback, feed-forward, or predictive loop(s) resulting from the process and filtration parameters and other data used to implement the invention. Some or all of the controller system functions may be at a central location, such as a network server, for communication over a local area network, wide area network, wireless network, extranet, the Internet, microwave link, infrared link, the like, and any combinations of such links or other suitable links. In addition, other components such as a signal conditioner or system monitor may be included to facilitate signal transmission and signal-processing algorithms.

In one embodiment, the controller is operable to implement the method of the invention in a semi-automated or fully-automated fashion. In another embodiment, the controller is operable to implement the method in a manual or semi-manual fashion.

In addition to process parameter and filtration data, a dataset collected during implementation of the method of the invention, for instance, may include other variables or system parameters such as oxidation-reduction potential, pH, levels of certain chemicals or ions (e.g., determined empirically, automatically, fluorescently, electrochemically, colorimetrically, measured directly, calculated, etc.), temperature, turbidity, particle counts, particle volume, pressures, process stream flow rate, dissolved or suspended solids, the like, and any combination thereof. Such system parameters are typically measured with any type of suitable data measuring/sensing/capturing equipment, such as pH sensors, oxidation reduction potential (ORP) probes, ion analyzers, temperature sensors, thermocouples, pressure sensors, corrosion probes, and/or any other suitable device or method. Such data capturing equipment is preferably in communication with the controller and, according to alternative embodiments, may have advanced functions (including any part of the control algorithms described herein) imparted by the controller. In an embodiment, the controller may receive process information or data from another controller, for example a stand-alone controller or a master DCS platform (data collection system) that may incorporate an individual sensor or a group of sensors and may communicate data individually or collectively to the controller.

Data transmission of any of the measured parameters or signals to a user, chemical pumps, alarms, or other system components is accomplished using any suitable device, such as a wired or wireless network, cable, digital subscriber line, internet, etc. Any suitable interface standard(s), such as an ethernet interface, wireless interface (e.g., IEEE 802.11a/b/g/n, 802.16, Bluetooth, optical, infrared, other radiofrequency, any other suitable wireless data transmission method, and any combination of the foregoing), universal serial bus, telephone network, the like, and combinations of such interfaces/connections may be used. As used herein, the term "network" encompasses all of these data transmission methods. Any of the components, devices, sensors, etc. herein described may be connected to one another and/or the controller using the above-described or other suitable interface or connection.

In an embodiment, information (collectively referring to all of the inputs or outputs generated by the method of the invention) is received from the system and archived. In another embodiment, such information is processed according to a timetable or schedule. In a further embodiment, such information is immediately processed in real-time/substantially real-time. Such real-time reception may also include, for example, "streaming data" over a computer network.

In embodiments, the method of the invention comprises a plurality of system parameters individually, collectively, sequentially, or simultaneously determined to be within or without a predetermined range, above a threshold value, or below a threshold value.

In embodiments the predetermined range and the threshold value are independent for each system parameter.

The present invention is a novel method for an on-demand system of maintaining the quality of the water in a process stream. It should be appreciated that the present invention has applicability in a broad variety of process streams in industrial or non-industrial water systems including any fluid system used in an industrial or non-industrial process. In embodiments, the method of the present invention is applicable to industrial aqueous systems. Typically, the industrial aqueous systems are involved in processes that are either used for the production of a product or participate in the production process so that chemical, mechanical, and biological processes can be conducted to reach a desired outcome in the process. Process streams having process water include evaporative cooling towers, boilers, boiler condensate, pasteurizers, hot water heaters, heat exchangers, steam generators, nuclear power electric systems, combustion engine and diesel coolant systems, evaporator systems, thermal desalination systems, papermaking operations, fermentation processes, cleaning and rinsing water, recycled waste water, ballast water, cruise ship gray water, and the like are a sampling of the types of water systems that are affected by many varieties of contamination.

In embodiments, the method of the present invention is applicable, adaptable, beneficial, and useful where the process stream comprises a fluid that is non-aqueous in nature. Such a non-aqueous system may include a produced product, for example extracted or produced oil, and the described invention can be used to remove effectively any suspended material, correct other process or system parameters, or aid in demulsification or other refining methods to improve product quality. In another example, the non-aqueous system would be a process integral system such as lubricating oils for different industrial equipment, such as conveyor chain lubrication or pump lubrication. The application of the described invention would be, for example, to remove the suspended solids that occur as contaminants and improve the performance of the non-aqueous system and reduce stress on the system. This application could be in-process or in a remote recycling mode. In yet another example, non-aqueous systems that are recycled for further processing such as cooking oil recycling, to further produce bio-fuels would be a suitable application for the described invention.

In embodiments, the instant invention is applicable, adaptable, beneficial, and useful in non-industrial process streams. Examples of such a non-industrial system include the potable or non-potable water systems in institutional settings, such as hospitals, office buildings, universities, residential buildings, etc. The source of the potable water system may be municipal supply, well water, or another suitable source such as a river or lake. The incoming water may undergo a treatment process before use and the described invention would be used as part of treatment process to remove suspended material from the aqueous system or correct other process or system parameters. In another example, the described invention could be integral to and would benefit non-industrial aqueous systems such as swimming pools, spas, hot-water tubs, etc. In yet another example, the described invention will be integral to and benefit applications that straddle applications within the industrial and non-industrial definitions. An example of such an application would be storm water runoff that may be collected and then treated before being used either as potable water or for an industrial application. In this example, the quality of the incoming water can and will vary significantly and the described invention will have a significant impact on the process of effectively removing suspended solids. In yet another example, the 'gray water' which is water produced as a consequence of human activity, for example toilets, showers, etc., may be collected and recycled either as potable water or for an industrial or non-industrial application. In these examples, the water may in alternative embodiments be collected and processed locally or at a remote location and then re-delivered.

In embodiments, the method comprises decontaminating process streams or stabilizing a process parameter in process streams based on system needs of any given water system. In an aspect, the invention is implemented as an automated function of the quality of water being filtered. The quality of the water being filtered and hence the need for filtration is typically established by monitoring one or more system parameters. Common system parameters may be directly measured or calculated values and include but are not limited to oxidation-reduction potential, pH, levels of certain chemicals or ions, fouling index (FI), feed fouling index (FFI), temperature, turbidity, pressure, process stream flow rate, dissolved or suspended solids, and any combination thereof. In embodiment, monitoring certain operational parameters may also be used either alone or in combination with other system parameters. Operational parameters include but are not limited to operation/dosing rate of the oxidizing biocide pump, on-line monitoring of biocide (e.g., residual biocide measured as free chlorine), monitoring microbial activity, back-wash frequency of the filtration device (e.g., residual biocide measured as free chlorine), a bioreporter signal, and combinations thereof.

In embodiments, the flow rate may be a function of at least one system parameter or a plurality of different system parameters. In embodiments, the flow rate may be a function of a mathematical derivative at least one system parameter or a plurality of different system parameters.

The quality of the cooling or process water is often monitored for several different parameters (e.g., turbidity, oxidation-reduction potential, pH, etc.) to ensure optimal operational performance. The same parameters can be utilized to automate the process of the on-demand filtration system of the present invention. For example, water quality may be monitored by the use of a turbidity sensor, and/or a fouling monitor, and/or by the monitoring of the microbiological activity that may or may not be controlling the addition of the biocide into the system. In addition, the filtration device backwash frequency, based on differential pressure or time-based, may be recorded and used as a measure of water quality.

In an embodiment, 2-4% of the recirculation rate of the filtration systems for a process stream is filtered under the theory that over a period of time the small amount of filtered water will improve the water quality of the entire system. It is envisaged that any significant changes in water quality will also be reflected in the process parameters described herein, such as turbidity, FI, FFI, the operation of the oxidizing biocide pump, on-line biocide monitoring (e.g., free chlorine), microbial activity, backwash frequency, etc. Any of these parameters alone, or in combination, will change as a consequence of a change in water quality. Changes in the water quality could be perceived to either go positive (improvement) or negative (deterioration) from the set limits for the operational conditions. As a consequence of changes in the water quality, it is a preferred aspect of this invention to modify the filtration process via the controller. Under the scenario where the water quality was consistently progressing negative (i.e., deteriorating) the volume of water passing the filtration device may be automatically increased or additional filters may be brought on-line to restore the water quality. In cases where the water quality has improved, there would be the opportunity, as also invented here, to control the filtration process and reduce the volume of water passing through the filtration device or reduce the number of filters in use via the controller. This invention thus pertains to modification, positive or negative variation, of the actual percentage of water that is sent through the filtration device(s), in response to changes in the water quality.

In other embodiments, the water flow rate through the filter system is modified as a percentage of the total process stream or recirculation flow. For example, the filtration system of the invention reduces turbidity or favorably changes other process parameters. Even when a relatively low percentage of the total recirculating volume of the process stream is treated (e.g., 2-4%), continuous filtration over time can improve the quality of the recirculating water, including reduction in turbidity. In an embodiment, the initially filtered volume is between 2-4% of the recirculation rate when, for instance, turbidity values in the system will be high. The filtered percentage is then reduced when the turbidity values (e.g., recorded on-line) have reduced below their set/initial value. In the situation where turbidity values are close to 1 NTU, an ultra-microfiltration membrane device can operate with inlet water flow equivalent to 0.4% of the recirculation rate.

Examples of process contamination include process oil contamination and concomitant microbial growth in cooling water applications. These and other process phenomena can be analytically detected by, for example, turbidity and/or on-line total organic content (TOC) measurements. Undesired increases in TOC can lead to operational issues, uncontrolled microbial growth and biofilm formation. Passing the oil-contaminated feed water through oil compatible filters could facilitate partial or total removal of the oily contaminants. Reduction of the oily contaminants in the water stream could reduce biofilm growth and potentially reduce safety and health related risks. In another embodiment of this invention, the inlet flow rate can be increased from 0% to, for example, 15-20% of the recirculation rate when the water quality is altered due to organic process oil contamination, and can be expressed or documented by TOC recorded on-line and/or turbidity. In an embodiment, when TOC values are reduced to the acceptable levels, the filtered water flow equivalent can be lowered, for example, to 2-4% or the initial set-point corresponding to a percentage of the recirculation rate, or it can be stopped completely.

Microbial growth can also be controlled by limiting life-sustaining nutrient, air, and heat sources for bacteria. In cooling water applications, it is difficult to limit these sources. However, an incidental increase in soluble nutrients, failure of bio-control devices (biocide pump or the like), the presence of suspended solids, or the presence of deposits can act to provide an attachment and proliferation site for microbes, This scenario often results in uncontrolled microbial growth, biofilm formation, and potential safety and health related risks. In another embodiment, the inlet flow rate can be increased, for example, from 2-4% to 5-10% of the recirculation rate when the water quality is altered due to an increase in the microbial level, as identified by an off-line or any other on-line microbial monitoring device. When the microbial levels are reduced to the pre-set limit or specification levels, the filtered water flow equivalent can be lowered to the original 2-4% of the recirculation rate, or it can be stopped completely.

In another embodiment of this invention, the inlet flow rate can be increased for example from 2-4% to 5-10% or 15-20% of the recirculation rate to accommodate predictive circumstances when an increase in contaminant level is anticipated. Examples of such circumstances include seasonal variations, such as summer and dry times or persistent stormy conditions, which result in higher contaminant loads into the catchment area for the water system from adjoining areas. Another example of such a circumstance is when the system undergoes mechanical operation or maintenance that may dislodge material from one part of the system into the main water system. The cleaning of pipes, pressure washing of surfaces, or shoveling of tanks would be examples where settled material is released into the open water system.

In embodiments, the controller is operable to adjust the flow rate through the filtration device from 0% to 100% of the total volume of the process stream.

In an embodiment, the filtration system is triggered by a change in pressure of the process stream. In this circumstance the process will be affected by an increase or a decrease in incoming water pressures. A significant change, for example beyond the set-points, would significantly alter the operational conditions of the filtration device. Under such circumstances, the filtration device could reduce, increase, or stop flow into the filtration device.

In yet another embodiment, a change in the operational conditions that result in the modification of the filtration device operations would result in a signal that can be stored or converted to an attention-seeking signal, for example an audible or a visual alarm.

In an embodiment, the filtration system comprises a plurality of components. The components may include, for example, one, two, or more filters, separators, ultraviolet lights, and the like. Under certain circumstances or scenarios, process conditions or contaminants may require the use of different filtration devices in a parallel fashion but controlled through a single master controller that may in turn receive input from several different individual controllers or sensors. Furthermore, there may be certain scenarios where a multi-staged approach would be adopted. In certain scenarios there may be the requirement where the same type of filter device is used in series but the contamination removal is staged. For example, the first device coming in contact with the contaminated water may carry a larger pore size screen to remove larger size particles followed by a second device with a smaller screen size to remove smaller particle size contaminants that pass through the first device. This strategy is particularly useful when the contaminant load is constantly high and it is not desirable to have relatively frequent backwash on the filtration device. In yet another example, an on-line centrifuge may be utilized to remove contaminants and the output from the centrifuge can be further purified by one or more filtration devices. In yet another example, the contaminant removal device may be couple with a secondary device such as an ultraviolet light that may act to oxidize or kill or disinfect the contaminants in the water stream or on the media contained in the device.

In embodiments, the filtration system comprises at least one filtration device selected from: a sand filtration device, a sieve filter, a bag filter, a cartridge filter, a centrifugal filter, a pressure filter, a membrane filtration device, the like, other suitable filters and devices, and combinations thereof.

In various embodiments, the filter system of the invention includes one, two, or more filters, filter devices, or filtration devices. The filters may be of any type, such as sand filters, diatomaceous earth filters, membrane filters, reverse osmosis filters, the like, other suitable filters and combinations thereof. Depending on water quality and application a combination of components and flow rates can be used to implement the method of the invention. The use of a plurality of components in this embodiment would be advantageous to remove different contaminant types based on, for example, their physical, chemical, or biological characteristics. For example, the filtration device that removes gross contaminants can filter a fixed water flow, whereas, the flow passing through the filter device that removes a targeted type of contaminants (e.g., bacteria or other microbe) can be adjusted depending on the water quality.

In some embodiments, sand or diatomaceous earth filters are used in the method of the invention. Sand or like filters are perhaps the most common type of filtration device in use.

These filter types, however, sometimes suffer from loss of performance and efficacy over time since the collected contaminants are not effectively removed, contaminants start to proliferate within the device on the media bed, or the device loses media during backwash. Such devices therefore require periodic maintenance for replenishment of the media or cleaning. Automated monitoring accompanied by alarming capabilities provided by the present invention will be operable to improve performance.

In embodiments where membrane filters are used, the filters may comprise one or more types of membranes. The number of membranes, types of membranes, and orientation of membranes (submerged/external) depends on various factors (e.g., the composition of the process stream) known to those of ordinary skill in the art.

In embodiments, the membrane separation system has at least one membrane selected from the group: an ultrafiltration membrane; a microfiltration membrane; a reverse osmosis membrane, a nanofiltration membrane, the like, other suitable membranes, and any combination thereof.

In another embodiment, the membrane separation system is a submerged membrane system, an external membrane separation system, or a combination thereof.

In embodiments, the membrane filtration device includes a membrane type selected from the group: polymeric, ceramic, metallic, hybrid of the foregoing, and combinations thereof.

The membranes utilized may have various types of physical and chemical parameters. With respect to physical parameters, in one embodiment, the ultrafiltration membrane has a pore size in the range of 0.003 to 0.1 µm. In another embodiment, the microfiltration membrane has a pore size in the range of 0.1 to 10 µm. In another embodiment, the membrane has a hollow fiber configuration with outside-in or inside-out filtration mode. In various embodiments, the membrane has a structure or configuration selected from one or more members of the following group: flat sheet configuration; tubular configuration; multi-bore structure; capillary configuration; spiral wound configuration; and combinations thereof. With respect to chemical parameters, in one embodiment, the membrane is polymeric. In another embodiment, the membrane is inorganic. In yet another embodiment, the membrane is stainless steel.

In an embodiment, the filtration device or any component thereof may be subject to modulation based upon one or more parameters of the process stream. In one embodiment, the controller is operable to modulate the filtration device or any component thereof in an automated fashion as described above relative to the controller. In another embodiment, such modulation is regulated in a semi-automated or manual fashion. For example, the instant invention may utilize a master control system capable of recognizing and controlling all individual water treatment components to provide a seamless water treatment system. For example, in response to different parameters such as alkalinity, pH, ORP, TOC, turbidity, added chemicals are often monitored to enable appropriate modulation of the water treatment. Data from such monitoring can be utilized/incorporated for the modulation of the filter device operation or for operation of the entire filter system. In yet another example, chemicals, such as those for scale control or corrosion control, are often traced and monitored. An increase or decrease in the consumption or dosage of these or other chemistries are indicative of changes in the water quality and may be utilized to modulate the filter device operation or for operation of the entire filter system.

Figure 1:
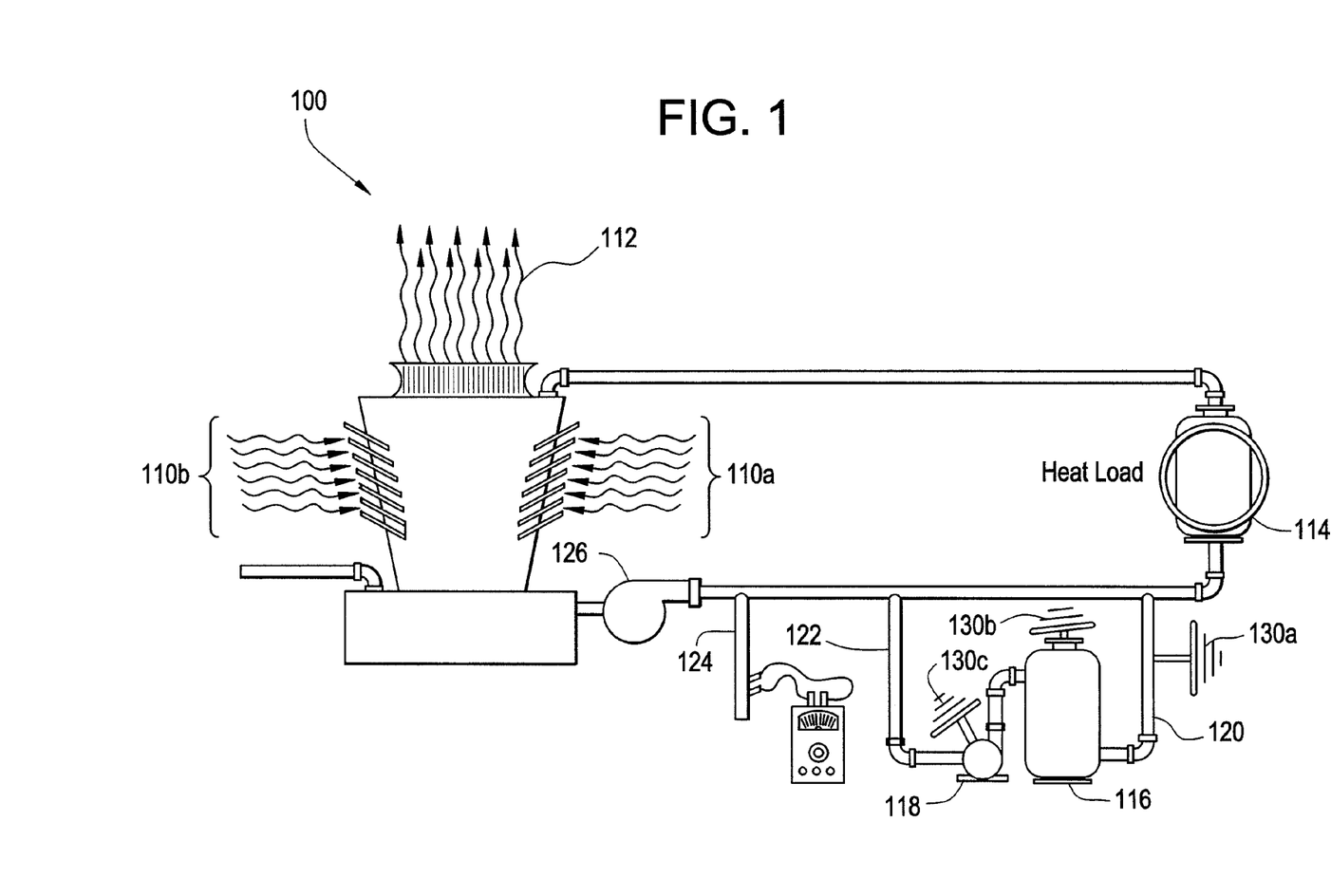
FIG. 1 is a schematic of an embodiment of the invention showing a side-steam filtration apparatus installed on the recirculation stream of a cooling tower.

Turning to the figures, FIG. 1 depicts a schematic of the side-stream filtration apparatus of an embodiment of the invention installed on the recirculation stream of a cooling tower. Cooling tower 100 is shown with exemplary sources of particle loading or contamination as well as a side-stream filtration system having, in this embodiment, one filter. Particle loading occurs in the system form a variety of sources. For example, contaminating particles enter the system via air flowing across the louvers of the cooling tower at areas 110a and 110b. Evaporation of the system water through evaporative area 112 further concentrates the particle loading from areas 110a and 110b. An additional example of a source of contamination is derived from process conditions. For example, heat exchanger 114 may generate particles or create conditions that change one or more parameters of the system.

Throughout the system, communication devices 130 (shown in FIG. 1 as 130a, 130b, and 130c) are operable to send and receive signals from the controller (not shown) to initiate flow of the process stream through side-stream inlet 122 as fluid in the process stream is pumped through the cooling system by pump 126. The controller is operable to activate filter device 116 and pump 118 to filter a measured amount of process fluid (e.g., aqueous or non-aqueous fluids) flowing side-stream inlet 122, through filter device 116, and finally through side-stream outlet 120 to introduce the filtered process stream back into the flow loop of the cooling system. Bleed stream 124 is also used under conditions known to those of skill in the art as an independent means of reducing contamination in the process stream.

Figure 2:
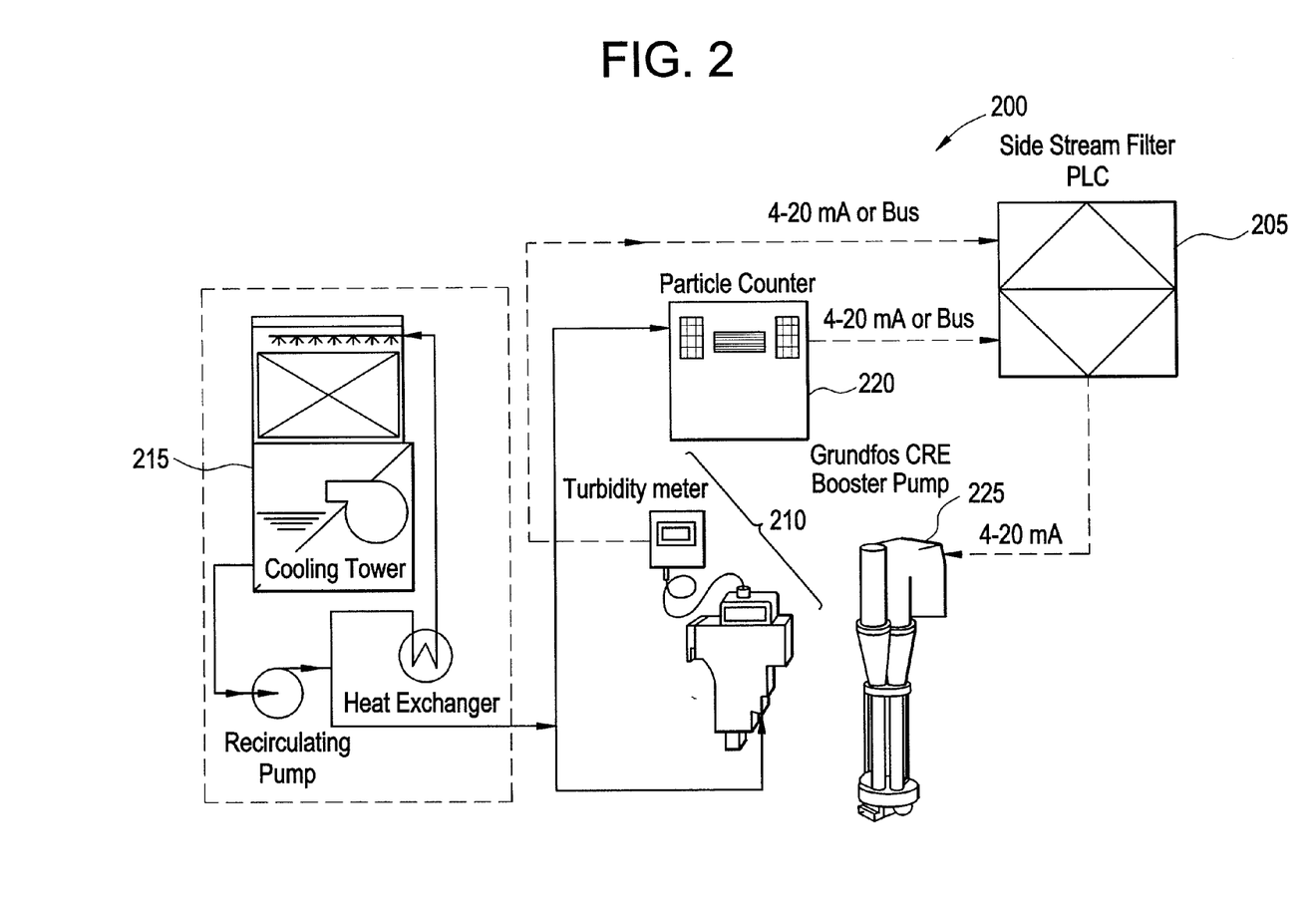
FIG. 2 is a schematic of an embodiment of the invention showing a filter system controlled through a turbidity sensor.

FIG. 2 is a schematic of an embodiment of the invention showing filter system 200 with combination program logic controller (PLC) and side-stream filter 205 and turbidity sensor 210. In this embodiment, the process stream flowing through cooling tower system 215 is in fluid communication with PLC and side-stream filter 205, turbidity sensor 210, and/or particle counter 220. Turbidity sensor 210 and/or particle counter 220 are in communication with the controller (not shown). It should be appreciated that such an arrangement with a PLC may include an additional controller in certain embodiments. In embodiments, a variable size sample of the process stream is diverted into the water quality monitoring, data acquisition, and control system comprised of PLC and side-stream filter 205, turbidity sensor 210, particle counter 220, and booster pump 225. In an embodiment, boost pump 225 comprises a frequency converter as part of the variable speed pump thereby controlling discharge volume and pressure relative to, for example, an analog or digital signal received from the controller.

In an embodiment of FIG. 2, an analogue or digital signal from turbidity sensor 210 is transmitted to the controller. The controller is in turn operable to initiate flow into PLC and side-stream filter 205 via a side stream flow controller (not shown). Depending on the offset between the measured variable (turbidity in this example) and a set-point or set-range for that variable, the controller generates an output that is then used to vary the speed of booster pump 225 to control flow through PLC and side-stream filter 205. In another embodiment, the configuration of PLC and side-stream filter 205 may enable maintenance of the desired level of turbidity. The components shown in FIG. 2 (along with components not shown) may form a closed loop control circuit or may also include additional variable measurements and inputs as described herein.

The foregoing may be better understood by reference to the following examples, which are intended for illustrative purposes and are not intended to limit the scope of the invention.

Example 1

This example illustrates the use of backwash frequency to give on-demand variation of water flow to a dead-end ultra-microfiltration device. A side-steam filtration device, for example a dead-end membrane system, required for a cooling system with a system volume of about 40 m$^3$ and a recirculation rate of 120-140 m$^3$/hr, should be able to deliver 2.4-4.8 m$^3$/hr of permeate. During normal operation, suspended solids, inorganic and organic foulants (such as microorganisms), present in the water will cause fouling of the filtration device and result in increased differential pressure across the membrane. At a certain set differential pressure, the filtration system will automatically backwash to reduce the built up fouling matter on the filter matrix. Higher levels of suspended solids and/or bacteria to be filtered-out tend to correlate with higher backwash frequency. Therefore, the backwash frequency can be reflective of changes in the quality of the recirculating water.

In filtration devices, the pressure of the incoming water can be controlled by varying the speed of the inlet pump (where present), or the aperture of the inlet valve, in order to obtain the desired flow rate. For example, when the backwash interval is reduced by 50% of the initial setting, the aperture of the inlet water valve, or the speed of the inlet pump could be automatically changed to deliver 50% less water to the filtration system, thereby lowering the percentage of water filtered by 50%. For example, instead of filtering 2.4 m$^3$/hr of water the device would treat 1.2 m$^3$/hr. When the backwash interval is lowered even more, the inlet water flow can be further lowered. Should any unexpected contamination or change occur, for example from process leakage, then changes in water quality will be detected and the duty of the pump or the inlet aperture can be modified and more water can be filtered to restore the water quality and prevent fouling of the critical processes served by the water, such as heat exchangers.

Example 2

This example illustrates an embodiment where total viable counts (TVC) or microbial activity (adenosine triphosphate (ATP) measurement, bioreporter, and/or any other biomarker that monitors microbial activity, oxygen depletion) is used in a manual or automated fashion to give on-demand control of filtration systems. Microbial activity is often monitored rather rigorously to maintain process conditions and operational performance. Automated monitoring of microbial activity or other process parameters, such as oxidation reduction potential (ORP) or any parameter as described herein, are then used to control the biocide addition process. When the values for a given parameter go below a certain set-point or set-range, biocide addition is triggered and the addition stops when the value exceeds the set-point or is within a set-range. This biocide addition control logic can also be used to control the filtration device. The amount of water filtered can be more when the system parameter is seeking more biocide and conversely less water is filtered when less biocide is needed. When microbiological activity is increasing, pump operation will increase as well. In order to lower biocide consumption, the flow of water to be filtered can be increased, removing more suspended matter and microorganisms from the system and lowering biocide consumption. However, as the microbiological activity detected in the system goes down as a result of the treatment, the dosing pump output will be reduced, and the volume of water passing though the filter can be lowered accordingly. In embodiments, a frequency converter is built-in to the pump motor to vary the speed of the pump thereby controlling the discharge volume and pressure in accordance with the analog or digital signal and instructions received from the controller.

Example 3

In yet another example, process stream parameters are used as an indicator of water quality and used to give on-demand control of filtration systems. Process stream parameters such as turbidity, pH, refractive index, or the usage of process treatment chemicals such as scale control agents or corrosion control agents can be indicative of changes in water quality. If there is an increase or decrease in any of such parameters, the water flow through the filtration device can be modulated to accommodate the change and maintain the required performance. For example, a sudden increase in turbidity would suggest an influx of contaminants into the water system and therefore the volume of water passing through the filtration device could be increased or extra filters could be brought on-line to accommodate for the increase. In contrast, if the turbidity decreased then lesser volume of water could be sent through the unit or filters could be taken off-line since the water is running cleaner with reduced turbidity.

In another example scenario if the water system was undergoing maintenance cleaning then the volume of water sent through the filtration device could be altered to accommodate the entire water volume. This would help in the removal of the dislodged material and also prevent the redeposition of the dislodged material into other areas of the water system being cleaned.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A method of removing contaminants from a non-aqueous process stream or stabilizing a system parameter in the non-aqueous process stream, the method comprising:
   (a) providing only one side-stream filtration system consisting of one filter, the side-stream filtration system in communication with a controller and in fluid communication with the non-aqueous process stream, wherein the controller automatically initiates a flow from the non-aqueous process stream into the side-stream filtration system when the system parameter of the non-aqueous process stream is above an upper threshold value and/or below a lower threshold value, wherein the flow into the side-stream filtration system is a percentage of the total non-aqueous process stream such that a part of the total non-aqueous process stream is unfiltered;
   (b) activating the side-stream filtration system, wherein the flow comprises a flow rate through the side-stream filtration system and the controller adjusts the flow rate.

2. The method of claim 1, wherein the non-aqueous process stream is extracted or produced oil.

\* \* \* \* \*